United States Patent
Dai et al.

(10) Patent No.: US 10,678,738 B2
(45) Date of Patent: Jun. 9, 2020

(54) MEMORY EXTENSIBLE CHIP

(71) Applicant: HUAWEI TECHNOLOGIES CO., LTD., Shenzhen, Guangdong (CN)

(72) Inventors: Fen Dai, Shenzhen (CN); Xing Hu, Shenzhen (CN); Jun Xu, Nanjing (CN); Yuangang Wang, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/365,677

(22) Filed: Mar. 27, 2019

(65) Prior Publication Data
US 2019/0220434 A1 Jul. 18, 2019

Related U.S. Application Data

(63) Continuation of application No. PCT/CN2016/100795, filed on Sep. 29, 2016.

(51) Int. Cl.
*G06F 13/40* (2006.01)
*H04L 12/26* (2006.01)
(Continued)

(52) U.S. Cl.
CPC .......... *G06F 13/4045* (2013.01); *G06F 12/02* (2013.01); *G06F 13/14* (2013.01);
(Continued)

(58) Field of Classification Search
CPC .................................................... G06F 13/00
See application file for complete search history.

(56) References Cited

U.S. PATENT DOCUMENTS 8,045,546 B1 * 10/2011 Bao .......................... H04L 45/14
370/386
8,108,647 B2 1/2012 Bartley et al.
(Continued)

FOREIGN PATENT DOCUMENTS

CN 102184139 A 9/2011
CN 103081434 A 5/2013
(Continued)

OTHER PUBLICATIONS

Jo, Multi-Die Polylithic Integration Enabled by Heterogeneous Interconnect Stitching Technology, 2018, IEEE, pp. 11-13. (Year: 2018).*

(Continued)

*Primary Examiner* — Cheng Yuan Tseng
(74) *Attorney, Agent, or Firm* — Womble Bond Dickinson (US) LLP (57) ABSTRACT

A memory extensible chip (200) is provided. The chip (200) includes a substrate (240), and a processor (230), a first memory module set (210), and a second memory module set (220) that are integrated on the substrate (240). The processor (230) communicates with at least one memory module in the first memory module set (210) using a first communications interface (250), and the processor (230) communicates with at least one memory module in the second memory module set (220) using a second communications interface (260). A memory module in the first memory module set (210) communicates with a memory module in the second memory module set (220) using a substrate network, where the substrate network is a communications network located inside the substrate (240). In this way, the processor (230) can access a memory module in the first memory module set (210) by using the second memory module set (220).

18 Claims, 2 Drawing Sheets

(51) Int. Cl.
*G06F 13/16* (2006.01)
*G06F 12/02* (2006.01)
*G06F 15/78* (2006.01)
*G06F 13/14* (2006.01)

(52) U.S. Cl.
CPC ...... *G06F 13/1668* (2013.01); *G06F 15/7807* (2013.01); *H04L 43/08* (2013.01); *G06F 2213/0038* (2013.01)

(56) References Cited

U.S. PATENT DOCUMENTS

| | | | |
|---|---|---|---|
| 8,190,855 | B1 | 5/2012 | Ramey et al. |
| 9,111,151 | B2* | 8/2015 | Chen ................ G06F 15/7825 |
| 9,391,871 | B1* | 7/2016 | Abts ..................... H04L 47/10 |
| 9,448,940 | B2* | 9/2016 | Shalf .................. G06F 12/0813 |
| 9,837,391 | B2* | 12/2017 | Khare ..................... G06F 1/12 |
| 10,257,076 | B2* | 4/2019 | Han ...................... H04L 45/20 |
| 2006/0282599 | A1 | 12/2006 | Chiu |
| 2011/0145522 | A1 | 6/2011 | Larson |
| 2012/0054452 | A1 | 3/2012 | Kumar et al. |
| 2014/0195710 | A1 | 7/2014 | Sasaki et al. |
| 2015/0103822 | A1* | 4/2015 | Gianchandani ......... H04L 69/08 370/389 |
| 2015/0355848 | A1 | 12/2015 | Hayes et al. |
| 2016/0034195 | A1 | 2/2016 | Li et al. |

FOREIGN PATENT DOCUMENTS

| | | |
|---|---|---|
| CN | 103927274 A | 7/2014 |
| CN | 104484021 A | 4/2015 |
| CN | 105632545 A | 6/2016 |
| CN | 105706065 A | 6/2016 |
| CN | 105718380 A | 6/2016 |
| CN | 106030553 A | 10/2016 |
| EP | 0700002 A1 | 3/1996 |
| WO | 2014/178856 A1 | 11/2014 |

OTHER PUBLICATIONS

N. E. Jerger et al. "NoC Architectures for Silicon Interposer Systems: Why Pay for more Wires when you Can Get them (from your interposer) for Free?" in 2014 47th Annual IEEE/ACM International Symposium on Microarchitecture, Dec. 2014, total 13 pages.

* cited by examiner

MEMORY EXTENSIBLE CHIP

CROSS-REFERENCE TO RELATED APPLICATIONS

This application is a continuation of International Application No. PCT/CN2016/100795, filed on Sep. 29, 2016, the disclosure of which is hereby incorporated by reference in its entirety.

TECHNICAL FIELD

The present invention relates to the field of integrated circuits, and in particular, to a memory extensible chip.

BACKGROUND

In-memory computation is a computation method in which all data is loaded into memory. Loading all data into memory avoids that the data is written into or read from a hard disk, so that a processing rate of a chip is increased.

In-memory computation requires a relatively large memory capacity and relatively large bandwidth, and therefore requires that a large quantity of memory modules be connected to a processor. If each memory module is directly connected to the processor, bandwidth that can be used by each memory module is only 1/N of total bandwidth (assuming that N memory modules are directly connected to the processor). If a plurality of memory modules are used as a memory module set and are directly connected to the processor by using one memory module in the memory module set, bandwidth that can be used by each memory module set is relatively large; however an average hop count of accessing the memory modules by the processor increases, and therefore rates at which the processor accesses the memory modules decrease.

Therefore, how to integrate more memory modules on the chip and ensure high memory bandwidth and a relatively short access latency is a problem that urgently needs to be resolved.

SUMMARY

In view of this, an embodiment of the present invention provides a memory extensible chip, a processor and at least two memory module sets are integrated on a substrate, and the at least two memory modules sets are connected by using a substrate network, so that high memory bandwidth and a relatively fast access rate can be ensured while more memory modules are integrated.

The memory extensible chip includes a substrate, and a processor, a first memory module set, and a second memory module set that are integrated on the substrate, where the processor communicates with at least one memory module in the first memory module set by using a first communications interface, and the processor communicates with at least one memory module in the second memory module set by using a second communications interface; and a memory module in the first memory module set communicates with a memory module in the second memory module set by using a substrate network, where the substrate network is a communications network located inside the substrate.

The memory extensible chip provided in this embodiment of the present invention connects a plurality of memory module sets together by using the substrate network, so that the processor can access a memory module in the first memory module set by using the second memory module set. In this way, a communications interface whose load is relatively heavy can be bypassed, and a latency of accessing the memory module by the processor is shortened.

In one embodiment, the processor includes a plurality of processor cores, the plurality of processor cores communicate with each other by using a network on chip, and the network on chip is a communications network located outside the substrate; and the first memory module set and the second memory module set each include a plurality of memory modules.

The chip that has a multi-core processor and a plurality of memory modules can provide more communication paths, and helps to bypass a communication path whose load is relatively heavy, so that a latency of accessing a memory module by the processor can be shortened.

In one embodiment, any two memory modules in the first memory module set communicate with each other by using the substrate network; and any two memory modules in the second memory module set communicate with each other by using the substrate network.

When the first memory module set and the second memory module set each include a plurality of memory modules, any two memory modules in each memory module set may be connected to each other by using the substrate network, so that more optional communication paths can be provided. This helps to balance load of the entire chip.

In one embodiment, any one memory module in the first memory module set communicates with any one memory module in the second memory module set by using the substrate network.

Therefore, more optional communication paths can be provided, and this helps to balance load of the entire chip.

In one embodiment, the first communications interface and the second communications interface are located on different processor cores.

When load is unpredictable, different communications interfaces are disposed on different processor cores, thereby avoiding that communications interfaces are concentrated in one processor core and load of a communication path that passes the processor core is therefore relatively heavy.

In one embodiment, when a first processor core of the processor needs to access a first memory module in the first memory module set, the first processor core is configured to determine, from a plurality of communication paths that are from the first processor core to the first memory module, a communication path that has a minimum hop count as an access path.

According to the memory extensible chip provided in this embodiment of the present invention, a processor core that needs to perform a read/write operation determines an access path based on hop counts of a plurality of communication paths that are from the processor core to a memory module, so that a complex path selection operation can be avoided and a burden of the processor is alleviated.

In one embodiment, when a second processor core of the processor needs to access a second memory module in the first memory module set, the second processor core is configured to determine, from a plurality of communication paths that are from the second processor core to the second memory module, a communication path that has a minimum access latency as an access path.

According to the memory extensible chip provided in this embodiment of the present invention, a processor core that needs to perform a read/write operation determines an access path based on latencies of a plurality of communication paths that are from the processor core to a memory module, so that the access path can be adjusted in time depending on a change of the latencies of the communication paths. This helps to balance load of the entire chip.

In one embodiment, the second processor core is specifically configured to: determine a substrate network latency based on a memory latency and a memory hop count, where the memory latency is average time required for data transmission between any two adjacent memory modules in the chip, and the memory hop count is a quantity of memory modules passed during data transmission in the plurality of communication paths that are from the second processor core to the second memory module; determine a network-on-chip latency based on a core latency and a core hop count, where the core latency is average time required for data transmission between any two adjacent processor cores in the processor, and the core hop count is a quantity of processor cores passed during data transmission in the plurality of communication paths that are from the second processor core to the second memory module; determine, based on the substrate network latency and the network-on-chip latency, access latencies of the plurality of communication paths that are from the second processor core to the second memory module; and select a communication path that has a minimum access latency from the plurality of communication paths, as the access path.

According to the memory extensible chip provided in this embodiment of the present invention, a processor core that needs to perform a read/write operation determines an access path from a plurality of communication paths based on latencies, of different types of communications networks, in the communication paths, so as to determine latencies of different communication paths more precisely.

In one embodiment, the second processor core is further configured to: determine the substrate network latency based on the memory latency, the memory hop count, and a substrate network load parameter, where the substrate network load parameter is used to indicate a load amount of the substrate network.

The memory extensible chip provided in this embodiment of the present invention determines the substrate network latency by using the substrate network load parameter, so as to dynamically determine a latency of a communication path depending on a change of load of the substrate network.

In one embodiment, the second processor core is further configured to: determine the network-on-chip latency based on the core latency, the core hop count, and a network-on-chip load parameter, where the network-on-chip load parameter is used to indicate a load amount of the network on chip.

The memory extensible chip provided in this embodiment of the present invention determines the network-on-chip latency by using the network-on-chip load parameter, so as to dynamically determine a latency of a communication path depending on a change of load of the network on chip.

BRIEF DESCRIPTION OF DRAWINGS

To describe the technical solutions in the embodiments of the present invention more clearly, the following briefly introduces the accompanying drawings required in the embodiments of the present invention. Apparently, the accompanying drawings in the following description show merely some embodiments of the present invention.

DESCRIPTION OF EMBODIMENTS

The following clearly describes the technical solutions in the embodiments of the present invention with reference to the accompanying drawings in the embodiments of the present invention. Apparently, the described embodiments are some rather than all of the embodiments of the present invention.

Figure 1:
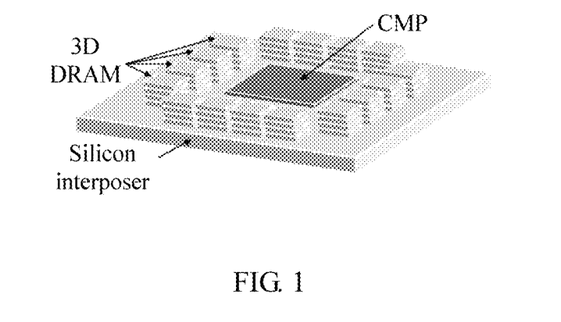
FIG. 1 is a schematic structural diagram of a memory extensible chip applicable to an embodiment of the present invention.

FIG. 1 is a schematic structural diagram of a memory extensible chip 100 applicable to an embodiment of the present invention. As shown in FIG. 1, the chip 100 includes a chip multiprocessor (CMP), a plurality of tree-dimensional (3D) dynamic random access memories (DRAM), and a silicon interposer that integrates the CMP and the plurality of DRAMs. A surface of the silicon interposer may be covered with a metal coating, and the DRAMs and the CMP may be inversely integrated on the silicon interposer. A plurality of micro-bumps used for communication are disposed between the silicon interposer and the CMP, and bandwidth of the CMP may be calculated based on pitches of the micro-bumps and a perimeter of the CMP.

A plurality of processor cores in the CMP are connected by using a network on chip (NoC). The NoC is a communications network located outside the silicon interposer. Communication between two DRAMs and communication between a DRAM and the CMP are performed by using a substrate network. The substrate network is a communications network located inside the silicon interposer. The NoC does not occupy any interior resource of the interposer, and therefore the substrate network can be used to provide abundant communication paths between the DRAMs and between the CMP and the DRAMs.

The chip 100 shown in FIG. 1 is merely used as an example for description, and this is not limited in this embodiment of the present invention. The chip 100 may be a central processing unit (CPU) chip, a graphics processing unit (GPU) chip, or another type of chip. A processor included in the memory extensible chip provided in this embodiment of the present invention may be a single-core processor, and a memory module included in the memory extensible chip may be a high bandwidth memory (HBM). A quantity of memory modules integrated in the chip is not limited to a quantity shown in FIG. 1. Neither positions of the memory modules relative to the processor nor positions of the memory modules relative to each other are limited to positions shown in FIG. 1. In addition, the silicon interposer is used as an example for description, and a substrate fabricated by using another material, such as a substrate fabricated by using a ceramic material, may alternatively be used for the memory extensible chip provided in this embodiment of the present invention.

Figure 2:
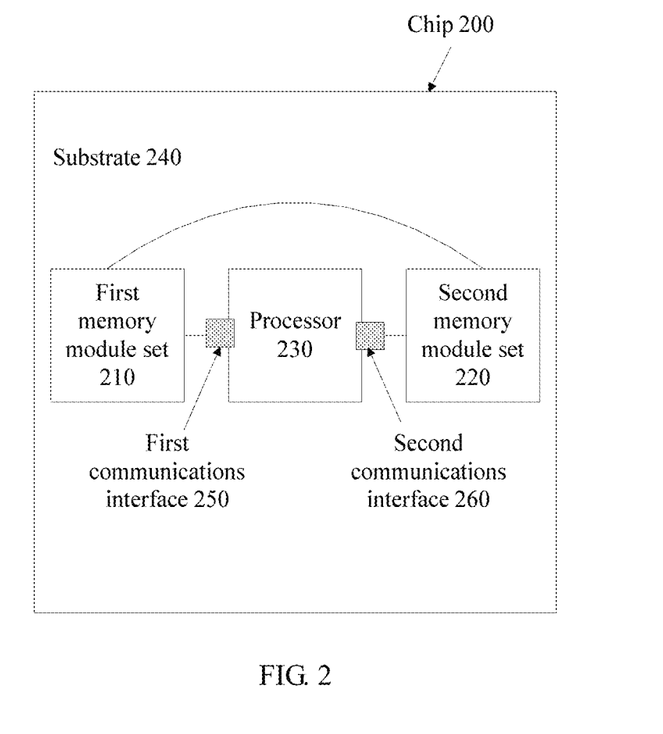
FIG. 2 is a schematic structural diagram of a memory extensible chip according to an embodiment of the present invention.

FIG. 2 is a schematic structural diagram of a memory extensible chip 200 according to an embodiment of the present invention. As shown in FIG. 2, the chip 200 includes:

a substrate 240, and a processor 230, a first memory module set 210 and a second memory module set 220 that are integrated on the substrate 240.

The processor 230 communicates with at least one memory module in the first memory module set 210 by using a first communications interface 250, and the processor 230 communicates with at least one memory module in the second memory module set 220 by using a second communications interface 260.

A memory module in the first memory module set 210 communicates with a memory module in the second memory module set 220 by using a substrate network. The substrate network is a communications network located inside the substrate 240.

It should be understood that the terms "a first" and "a second" in this embodiment of the present invention are merely used to differentiate different content but do not impose any other limitation on this embodiment of the present invention.

In this embodiment of the present invention, the substrate 240 is configured to integrate the processor 230, the first memory module set 210, and the second memory module set 220 together, and the substrate 240 can provide abundant substrate resources, to construct the substrate network. As shown in FIG. 2, a connection line between the first memory module set 210 and the second memory module set 220 belongs to the substrate network and is located inside the substrate 240, and a connection line between the first memory module set 210 and the processor 230 and a connection line between the second memory module set 220 and the processor 230 also belong to the substrate network and are located inside the substrate 240.

The first communications interface 250 and the second communications interface 260 may be micro-bumps.

When the processor 230 determines to access a memory module in the first memory module set 210, if load of the first communications interface 250 is not heavy, the processor 230 may directly access the memory module by using the first communications interface 250. In this way, a hop count of accessing the memory module in the first memory module set 210 by the processor 230 is minimum, and therefore a latency of accessing the memory module in the first memory module set 210 by the processor 230 is minimum. If load of the first communications interface 250 is relatively heavy, and in this case, load of the second communications interface 260 is not heavy, the processor may access the memory module in the first memory module set 210 by using the second communications interface 260 and the second memory module set 220. Therefore, a communication path whose load is relatively large can be bypassed, and a latency of accessing the memory module in the first memory module set 210 by the processor 230 is shortened.

The foregoing embodiment is merely used as an example for description, and this is not limited in this embodiment of the present invention. The memory extensible chip according to this embodiment of the present invention may further include more memory module sets, and each memory module set may include one or more memory modules.

The memory extensible chip according to this embodiment of the present invention connects a plurality of memory module sets together by using the substrate network, so that the processor can access a memory module in the first memory module set by using the second memory module set. In this way, a communications interface whose load is relatively heavy can be bypassed, and a latency of accessing the memory module by the processor is shortened.

In one embodiment, the processor 230 includes a plurality of processor cores, the plurality of processor cores communicate with each other by using a network on chip, and the network on chip is a communications network located outside the substrate 240.

The first memory module set 210 and the second memory module set 220 each include a plurality of memory modules.

The processor 230 may be a single-core processor, and the first memory module set 210 and the second memory module set 220 each may include one memory module (case 1); or the processor 230 may be a multi-core processor, and the first memory module set 210 and the second memory module set 220 each may include a plurality of memory modules (case 2). When a chip configured based on case 2 is compared with a chip configured based on case 1, a processor core of the chip configured based on case 2 has more communication paths to access a memory module, so that a communication path whose load is relatively heavy can be bypassed, and a latency of accessing the memory module by the processor is shortened.

In one embodiment, any two memory modules in the first memory module set 210 communicate with each other by using the substrate network.

Any two memory modules in the second memory module set 220 communicate with each other by using the substrate network.

When the first memory module set 210 and the second memory module set 220 each include a plurality of memory modules, any two memory modules in each memory module set may be connected to each other by using the substrate network, so that more optional communication paths can be provided. This helps to balance load of the entire chip.

In one embodiment, any one memory module in the first memory module set 210 communicates with any one memory module in the second memory module set 220 by using the substrate network. Therefore, more communication paths can be provided, and this helps to balance load of the entire chip.

In one embodiment, the first communications interface 250 and the second communications interface 260 are located on different processor cores.

If positions of communications interfaces on the processor are relatively close, load balance of the chip is affected. For example, with respect to a multi-core processor, if a first communications interface and a second communications interface are located on one processor core, all other processor cores need to access a memory module by using the processor core. As a result, load of a communication path that passes the processor core is relatively large. Therefore, different communications interfaces should be located on different processor cores and should be away from each other as far as possible. According to the memory extensible chip provided in this embodiment of the present invention, different communications interfaces are located on different processor cores, thereby helping to balance load of different communication paths of the entire chip much more.

In one embodiment, when a first processor core of the processor 230 needs to access a first memory module in the first memory module set 210, the first processor core is configured to determine, from a plurality of communication paths that are from the first processor core to the first memory module, a communication path that has a minimum hop count as an access path.

When the first processor core needs to access the first memory module, the first processor core may determine, from the plurality of communication paths that are from the first processor core to the first memory module, the communication path that has the minimum hop count as the access path, and by using the access path, read data stored in the first memory module or write data into the first memory module. It should be understood that, in this embodiment of the present invention, both "the first processor core" and "the first memory module" are indefinite nouns, the first processor core may be any one processor core that is in the processor 230 and that needs to perform a read/write operation, and the first memory module may be any one memory module in the first memory module set.

According to the memory extensible chip provided in this embodiment of the present invention, a processor core that needs to perform a read/write operation determines an access path based on hop counts of a plurality of communication paths that are from the processor core to a memory module, so that a complex path selection operation can be avoided and a burden of the processor is alleviated.

In one embodiment, when a second processor core of the processor 230 needs to access a second memory module in the first memory module set 210, the second processor core is configured to determine, from a plurality of communication paths that are from the second processor core to the second memory module, a communication path that has a minimum access latency as an access path.

When the second processor core needs to access the second memory module, the second processor core may determine, from the plurality of communication paths that are from the second processor core to the second memory module, the communication path that has the minimum access latency as the access path, and by using the access path, read data stored in the second memory module or write data into the second memory module. The access latency may be an average access latency within a period of time or may be an access latency at a current time point. It should be understood that, in this embodiment of the present invention, both "the second processor core" and "the second memory module" are indefinite nouns, the second processor core may be any one processor core that is in the processor 230 and that needs to perform a read/write operation, and the second memory module may be any one memory module in the first memory module set.

According to the memory extensible chip provided in this embodiment of the present invention, a processor core that needs to perform a read/write operation determines an access path based on latencies of a plurality of communication paths that are from the processor core to a memory module, so that the access path can be adjusted in time depending on a change of the latencies of the communication paths. This helps to balance load of the entire chip.

In one embodiment, the second processor core is specifically configured to:

determine a substrate network latency based on a memory latency and a memory hop count, where the memory latency is average time required for data transmission between any two adjacent memory modules in the chip, and the memory hop count is a quantity of memory modules passed during data transmission in the plurality of communication paths that are from the second processor core to the second memory module;

determine a network-on-chip latency based on a core latency and a core hop count, where the core latency is average time required for data transmission between any two adjacent processor cores in the processor, and the core hop count is a quantity of processor cores passed during data transmission in the plurality of communication paths that are from the second processor core to the second memory module;

determine, based on the substrate network latency and the network-on-chip latency, access latencies of the plurality of communication paths that are from the second processor core to the second memory module; and select a communication path that has a minimum access latency from the plurality of communication paths, as the access path.

Substrate types and manufacturing processes are different, so that transmission latencies of the substrate network and the network on chip may be the same or may be different. Therefore, corresponding transmission latencies need to be determined for different networks.

For example, if from the second processor core to the first communications interface 250, data needs to pass five processor cores (the second processor core is not counted into a quantity of processor cores that are passed by the data), the core hop count is five. Assuming that an average latency of each of the five hops is one millisecond (that is, the core latency is one millisecond), the network-on-chip latency is five milliseconds. If the processor is a single-core processor, that is, the second processor core is the only processor core of the processor, the network-on-chip latency is 0.

For another example, if being transmitted from the first communications interface 250 to the second memory module, data needs to pass five memory modules (the second memory module is counted into a quantity of memory modules that are passed by the data), the memory hop count is five. Assuming that an average latency of each of the five hops is one millisecond (that is, the memory latency is one millisecond), the substrate network latency is five milliseconds. If the second memory module is the only memory module in the first memory module set, the memory hop count is one, and the substrate network latency is one millisecond.

The second processor core may determine, based on the substrate network latency and the network-on-chip latency, the access latencies of the plurality of communication paths that are from the second processor core to the second memory module, so as to select, from the plurality of communication paths, the communication path that has the minimum access latency as the access path.

Therefore, according to the memory extensible chip provided in this embodiment of the present invention, a processor core that needs to perform a read/write operation determines an access path from a plurality of communication paths based on latencies, of different types of communications networks, in the communication paths, so as to determine latencies of different communication paths more precisely.

In one embodiment, the second processor core is further configured to:

determine the substrate network latency based on the memory latency, the memory hop count, and a substrate network load parameter, where the substrate network load parameter is used to indicate a load amount of the substrate network.

In one embodiment, the second processor core is further configured to:

determine the network-on-chip latency based on the core latency, the core hop count, and a network-on-chip load parameter, where the network-on-chip load parameter is used to indicate a load amount of the network on chip.

Larger network load means a longer transmission latency; therefore, using a network whose load is relatively large to perform communication should be avoided as much as possible. According to the memory extensible chip provided in this embodiment of the present invention, the processor core may determine the substrate network latency based on the memory latency, the memory hop count, and the substrate network load parameter. The substrate network load parameter is positively correlated to load of the substrate network. The second processor core may obtain the load parameter through a period of time of study, for example, the second processor core obtains the substrate network load parameter by analyzing a relationship between a load amount of the substrate network and a latency of the substrate network that are within a period of time, and determines the substrate network latency by multiplying the substrate network load parameter, the memory latency, and the memory hop count.

A similar method may be used to obtain the network-on-chip load parameter and to determine the network-on-chip latency. This is not repeatedly described herein.

Therefore, the memory extensible chip provided in this embodiment of the present invention determines the substrate network latency by using the substrate network load parameter, and determines the network-on-chip latency by using the network-on-chip load parameter, so as to dynamically determine a latency of a communication path depending on a change of load of the substrate network and the network on chip.

The following details a memory extensible chip provided in an embodiment of the present invention, and a method for selecting an access path of the chip.

Figure 3:
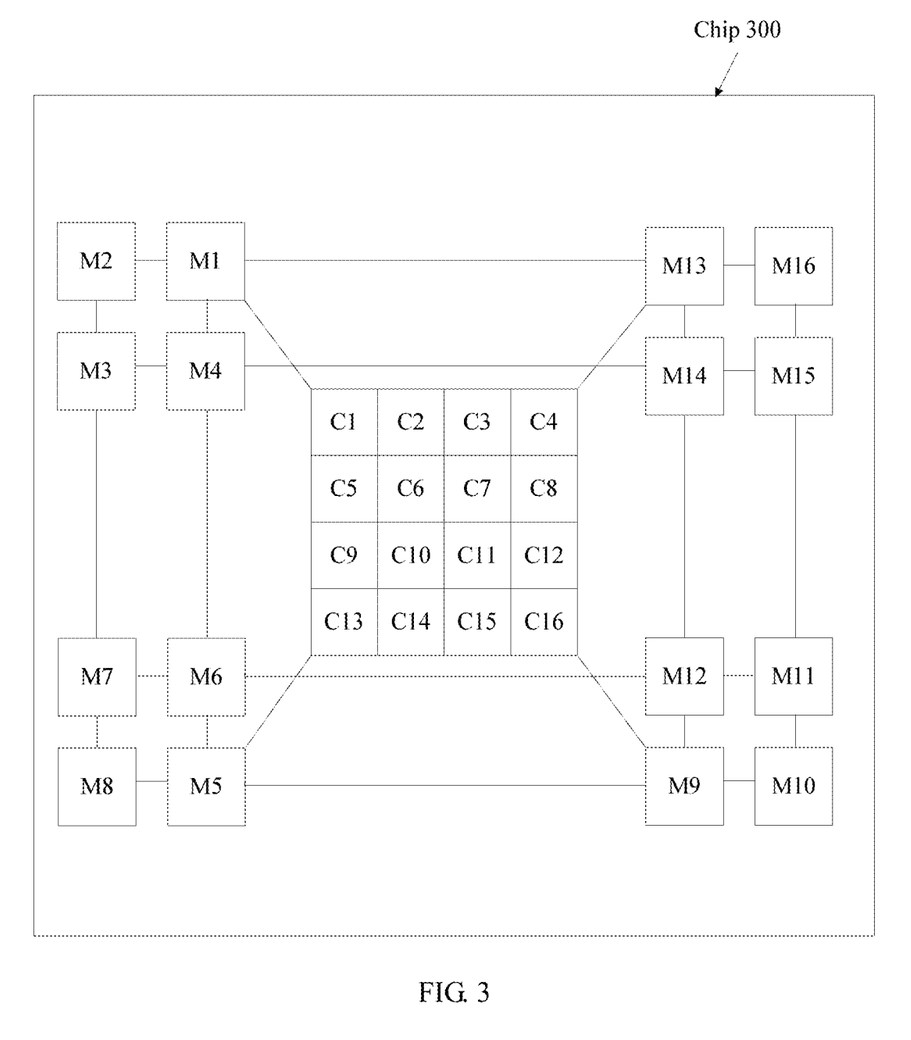
FIG. 3 is a schematic structural diagram of a memory extensible chip according to another embodiment of the present invention.

As shown in FIG. 3, a chip 300 includes a silicon interposer and one 16-core processor. Numbers of processor cores of the 16-core processor are C1 to C16. The chip 300 further includes four memory module sets. A first memory module set includes four memory modules whose numbers are M1 to M4, a second memory module set includes four memory modules whose numbers are M5 to M8, a third memory module set includes four memory modules whose numbers are M9 to M12, and a fourth memory module set includes four memory modules whose numbers are M13 to M16. M1 is connected to C1 by using a first communications interface, M5 is connected to C13 by using a second communications interface, M9 is connected to C16 by using a third communications interface, and M13 is connected to C4 by using a fourth communications interface. Connection lines between other memory modules represent that the memory modules are connected by using a substrate network. Therefore, the chip 300 provided in this embodiment of the present invention can provide more abundant communication paths for the processor by using communication connections between different memory module sets. This helps to balance load of the chip 300.

Assuming that only two adjacent processor cores in the processor can directly communicate with each other by using a network on chip, when C3 needs to access M5, C3 may first determine, from a plurality of communication paths that are from C3 to M5, a communication path that has a minimum hop count. For example, a first communication path is C3-C4-M13-M1-M4-M6-M5, and a second communication path is C3-C2-C1-O5-C9-C13-M5, so that a hop count of each communication path is six. C3 may select either of the first communication path and the second communication path as an access path without a need of considering load of each path, so that a complex path selection operation can be avoided and a burden of the processor is alleviated.

C3 may alternatively determine, based on a latency of each communication path, an access path to access M5, for example, may determine the access path based on a choose faster path (Choose Faster Path, CFP) algorithm.

The CFP algorithm can be as follows:

---

Algorithm 1 Choose Faster Path (CFP) Algorithm

Input: Current node, destination node
Output: Routing path
  /* Determine pillar routers */
  close_pillar := closest pillar to current node
  far_pillar:= closest pillar to destination node
  /* Calculate # of hops to destination */
  dest_close_NoC := # hops in NoC to/from close_pillar
  dest_close_NiSI := # hops in NiSI to/from close_pillar
  dest_far_NoC := # hops in NoC to/from far_pillar
  dest_far_NiSI := # hops in NiSI to/from far_pillar
  /* Calculate total expected time to destination */
  total_close = (dest_close_NoC × NoC_latency) +
  (dest_close_NiSI ×
NiSI_latency)
  total_far = (dest_far_NoC × NoC_latency) + (dest_far_NiSI ×
  NiSI_latency)
  if total_close ≤ total_far then
    Route via close_pillar
  else
    Route via far_pillar
  end if

---

The CFP algorithm can be parsed as follows:

1. current node represents a core node (namely, a processor core) that currently initiates an access request; and destination node represents a target memory node (namely, a memory module that needs to be accessed).

2. close_pillar represents that data is first routed to another core node that is closest to the current core node; and far_pillar represents that data is first routed to a core node that is closest to the destination memory node, that is, a core node that is farther away from the core node that currently initiates the access request.

3. total_close represents a total latency obtained, when a communication path is selected in a close_pillar manner, by adding up a substrate network latency and a network-on-chip latency, where dest_close_NoC represents a hop count of the network on chip, NoC_latency represents an average latency of each hop of the network on chip, dest_close_NiSI represents a hop count of the substrate network, and NiSI_latency represents an average latency of each hop of the substrate network. total_far represents a total latency obtained, when a communication path is selected in a far_pillar manner, by adding up a substrate network latency and a network-on-chip latency, where dest_far_NoC represents a hop count of the network on chip, NoC_latency represents an average latency of each hop of the network on chip, dest_far_NiSI represents a hop count of the substrate network, and NiSI_latency represents an average latency of each hop of the substrate network.

4. By comparing a value of total_close and a value of total_far, a communication path whose latency is smaller is selected as the access path.

In the foregoing method for selecting a communication path, load of a network is not considered, so that communication path selection steps are simplified, and a burden of the processor is alleviated.

Actually, larger network load means a longer transmission latency; therefore, in order to reflect latencies of different communication paths more precisely, load of the network needs to be considered.

For example, the network-on-chip latency may be calculated as follows: dest_close_NoC×NoC_latency×a network-on-chip load parameter. In addition, the substrate network latency may be calculated as follows: dest_close_NiSI× NiSI_latency×a substrate network load parameter. In actual application, the processor may determine the network-on-chip load parameter by collecting a load amount and a latency of the network on chip that are within a period of time, and the processor may further determine the substrate network load parameter by collecting a load amount and a latency of the substrate network that are within a period of time, so as to calculate a total latency of a communication path more precisely. For how the processor specifically determines the load parameters, refer to a related method in the prior art. This is not repeatedly described herein.

It may be understood that the chip provided in the embodiments of the present invention may be applied to a computing device having computing and storage capabilities, such as a computer or a server. Persons skilled in the art should know that, in addition to the chip described in the foregoing embodiments, the computing device may further include another component such as a hard disk or a network adapter. For example, the computing device is capable of receiving data by using a communications interface such as the network adapter, and computing and storing the received data by using the chip. This is not repeatedly described herein.

Persons of ordinary skill in the art may be aware that, in combination with the examples described in the embodiments disclosed in this specification, units and steps can be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

The system, apparatus, and method disclosed in the embodiments of this application may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces, indirect couplings or communication connections between the apparatuses or units, or electrical connections, mechanical connections, or connections in other forms.

The foregoing descriptions are merely specific implementations of the present invention, but are not intended to limit the protection scope of the present invention.

What is claimed is:

1. A memory extensible chip, comprising: a substrate, and a processor, a first memory module set, and a second memory module set that are integrated on the substrate of the chip, wherein
the processor communicates with at least one memory module in the first memory module set by using a first communications interface, and the processor communicates with at least one memory module in the second memory module set by using a second communications interface; and
a memory module in the first memory module set communicates with a memory module in the second memory module set by using a substrate network, wherein the substrate network is a communications network located inside the substrate of the chip, wherein a first processor core of the processor is configured to determine, from a plurality of communication paths that are from the first processor core to a first memory module of the first memory module set, a communication path that has a minimum hop count as an access path for accessing the first memory module in the first memory module set.

2. The chip according to claim 1, wherein:
the processor comprises a plurality of processor cores, the plurality of processor cores communicate with each other by using a network on chip, and the network on chip is a communications network located outside the substrate; and
the first memory module set and the second memory module set each comprise a plurality of memory modules.

3. The chip according to claim 2, wherein:
any two memory modules in the first memory module set communicate with each other by using the substrate network; and
any two memory modules in the second memory module set communicate with each other by using the substrate network.

4. The chip according to claim 2, wherein any one memory module in the first memory module set communicates with any one memory module in the second memory module set by using the substrate network.

5. The chip according to claim 2, wherein the first communications interface and the second communications interface are located on different processor cores.

6. The chip according to claim 1, wherein a second processor core of the processor is configured to determine, from a plurality of communication paths that are from the second processor core to a second memory module of the first memory module set, a communication path that has a minimum access latency as an access path for accessing the second memory module in the first memory module set.

7. The chip according to claim 6, wherein the second processor core is configured to:
determine a substrate network latency based on a memory latency and a memory hop count, wherein the memory latency is average time required for data transmission between any two adjacent memory modules in the chip, and the memory hop count is a quantity of memory modules passed during data transmission in the plurality of communication paths that are from the second processor core to the second memory module;
determine a network-on-chip latency based on a core latency and a core hop count, wherein the core latency is average time required for data transmission between any two adjacent processor cores in the processor, and the core hop count is a quantity of processor cores passed during data transmission in the plurality of communication paths that are from the second processor core to the second memory module;
determine, based on the substrate network latency and the network-on-chip latency, access latencies of the plurality of communication paths that are from the second processor core to the second memory module; and
select a communication path that has a minimum access latency from the plurality of communication paths, as the access path.

8. The chip according to claim 7, wherein the second processor core is further configured to:

determine the substrate network latency based on the memory latency, the memory hop count, and a substrate network load parameter, wherein the substrate network load parameter is used to indicate a load amount of the substrate network.

9. The chip according to claim 7, wherein the second processor core is further configured to:
determine the network-on-chip latency based on the core latency, the core hop count, and a network-on-chip load parameter, wherein the network-on-chip load parameter is used to indicate a load amount of the network on chip.

10. A computing device, comprising:
a storage;
a chip coupled to the storage and comprising:
 a substrate;
 a processor, a first memory module set, and a second memory module set that are integrated on the substrate of the chip;
 wherein the processor communicates with at least one memory module in the first memory module set by using a first communications interface, and the processor communicates with at least one memory module in the second memory module set by using a second communications interface; and
 a memory module in the first memory module set communicates with a memory module in the second memory module set by using a substrate network, wherein the substrate network is a communications network located inside the substrate of the chip, wherein a first processor core of the processor is configured to determine, from a plurality of communication paths that are from the first processor core to a first memory module of the first memory module set, a communication path that has a minimum hop count as an access path for accessing the first memory module in the first memory module set.

11. The computing device according to claim 10, wherein:
the processor comprises a plurality of processor cores, the plurality of processor cores communicate with each other by using a network on chip, and the network on chip is a communications network located outside the substrate; and
the first memory module set and the second memory module set each comprise a plurality of memory modules.

12. The computing device according to claim 11, wherein:
any two memory modules in the first memory module set communicate with each other by using the substrate network; and
any two memory modules in the second memory module set communicate with each other by using the substrate network.

13. The computing device according to claim 11, wherein any one memory module in the first memory module set communicates with any one memory module in the second memory module set by using the substrate network.

14. The computing device according to claim 11, wherein the first communications interface and the second communications interface are located on different processor cores.

15. The computing device according to claim 10, wherein a second processor core of the processor is configured to determine, from a plurality of communication paths that are from the second processor core to a second memory module of the first memory module set, a communication path that has a minimum access latency as an access path for accessing the second memory module in the first memory module set.

16. The computing device according to claim 15, wherein the second processor core is configured to:
determine a substrate network latency based on a memory latency and a memory hop count, wherein the memory latency is average time required for data transmission between any two adjacent memory modules in the chip, and the memory hop count is a quantity of memory modules passed during data transmission in the plurality of communication paths that are from the second processor core to the second memory module;
determine a network-on-chip latency based on a core latency and a core hop count, wherein the core latency is average time required for data transmission between any two adjacent processor cores in the processor, and the core hop count is a quantity of processor cores passed during data transmission in the plurality of communication paths that are from the second processor core to the second memory module;
determine, based on the substrate network latency and the network-on-chip latency, access latencies of the plurality of communication paths that are from the second processor core to the second memory module; and
select a communication path that has a minimum access latency from the plurality of communication paths, as the access path.

17. The computing device according to claim 16, wherein the second processor core is further configured to:
determine the substrate network latency based on the memory latency, the memory hop count, and a substrate network load parameter, wherein the substrate network load parameter is used to indicate a load amount of the substrate network.

18. The computing device according to claim 16, wherein the second processor core is further configured to:
determine the network-on-chip latency based on the core latency, the core hop count, and a network-on-chip load parameter, wherein the network-on-chip load parameter is used to indicate a load amount of the network on chip.

* * * * *